United States Patent
Niemann et al.

(10) Patent No.: US 9,452,726 B2
(45) Date of Patent: Sep. 27, 2016

(54) METHOD FOR RECORDING VEHICLE-RELEVANT DATA, IN PARTICULAR FOR DETECTING AND FOR EVALUATING MINOR DAMAGE, SENSOR ARRANGEMENT FOR INSTALLATION IN A VEHICLE AND VEHICLE HAVING THE SENSOR ARRANGEMENT FOR CARRYING OUT THE METHOD

(71) Applicant: Hella KGaA Hueck & Co., Lippstadt (DE)

(72) Inventors: Thomas Niemann, Delmenhorst (DE); Klaas Hauke Baumgaertel, Delmenhorst (DE); Karl-Ludwig Krieger, Brinkum (DE)

(73) Assignee: Hella KGaA Hueck & Co., Lippstadt (DE)

( * ) Notice: Subject to any disclaimer, the term of this patent is extended or adjusted under 35 U.S.C. 154(b) by 131 days.

(21) Appl. No.: 14/093,324

(22) Filed: Nov. 29, 2013

(65) Prior Publication Data

US 2014/0156106 A1    Jun. 5, 2014

(30) Foreign Application Priority Data

Nov. 30, 2012    (DE) .................. 10 2012 023 393

(51) Int. Cl.

| | |
|---|---|
| *B60R 21/013* | (2006.01) |
| *B60R 16/023* | (2006.01) |
| *B60R 21/0136* | (2006.01) |
| *G06F 17/18* | (2006.01) |

(Continued)

(52) U.S. Cl.
CPC ......... *B60R 21/013* (2013.01); *B60R 16/0232* (2013.01); *B60R 16/0234* (2013.01); *B60R 21/0136* (2013.01); *G01H 1/00* (2013.01); *G06F 1/02* (2013.01); *G06F 17/18* (2013.01); *B60R 99/00* (2013.01); *B60R 2021/01302* (2013.01)

(58) Field of Classification Search
None
See application file for complete search history.

(56) References Cited

U.S. PATENT DOCUMENTS

| | | | | |
|---|---|---|---|---|
| 4,842,301 | A | * | 6/1989 | Feldmaier ..................... 280/735 |
| 2004/0193068 | A1 | * | 9/2004 | Burton et al. ................. 600/544 |

(Continued)

OTHER PUBLICATIONS

Wohllebe et al. Einrichtung und Verfahren zur Beruhrungsdetektion fur ein Kraftfahrzeug. Translation used for citation purposes obtained via EPO website on Aug. 13, 2015. Publication date of German Application: Feb. 11, 2003.*

(Continued)

*Primary Examiner* — Rami Khatib
*Assistant Examiner* — Jeffrey Boomer
(74) *Attorney, Agent, or Firm* — Muncy, Geissler, Olds & Lowe, P.C.

(57) ABSTRACT

A method for recording vehicle-relevant data, in particular for detecting and evaluating damage to a vehicle in which structure-borne noise caused by an event, such as damage or contact, is detected and evaluated. The noise is recorded with its entire frequency spectrum, the frequency spectrum is divided into a lower frequency range and an upper frequency range, and an event is characterized by at least one amplitude in the upper frequency range. The event having an amplitude in the upper frequency range is included in an envelope curve analysis, in which a lower power density and upper power density are determined for a lower and upper frequency range, respectively. A relative measured value is determined from the ratio of the upper power density to the lower power density, an evaluation of the event is made by means of the relative measured value, and the event is stored.

6 Claims, 1 Drawing Sheet

(51) Int. Cl.
    *G01H 1/00*     (2006.01)
    *G05F 1/02*     (2006.01)
    *G06F 1/02*     (2006.01)
    *B60R 99/00*     (2009.01)

(56) References Cited

U.S. PATENT DOCUMENTS

2007/0185947 A1*   8/2007   Yoshitake et al. ............ 708/271
2009/0276125 A1*   11/2009   Brandmeier et al. ........... 701/47
2013/0340512 A1*   12/2013   Horlbeck et al. .......... 73/114.02
2014/0090472 A1*   4/2014   Lysen ............................. 73/587
2014/0142894 A1*   5/2014   Chang et al. ................. 702/181

OTHER PUBLICATIONS

Wikipedia. Definition: Energy spectral density. Archived by archive.com on Jun. 19, 2012. Accessed on Aug. 13, 2015.*

* cited by examiner

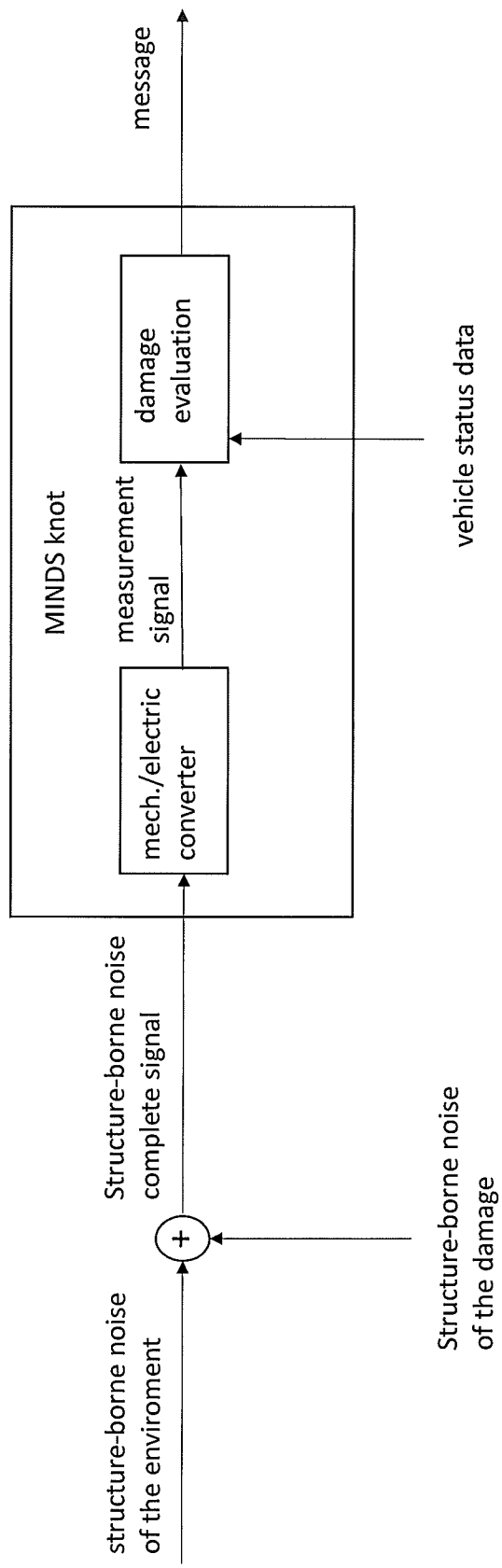

METHOD FOR RECORDING VEHICLE-RELEVANT DATA, IN PARTICULAR FOR DETECTING AND FOR EVALUATING MINOR DAMAGE, SENSOR ARRANGEMENT FOR INSTALLATION IN A VEHICLE AND VEHICLE HAVING THE SENSOR ARRANGEMENT FOR CARRYING OUT THE METHOD

BACKGROUND OF THE INVENTION

1. Field of the Invention

The invention relates to a method for recording vehicle-relevant data, in particular for detecting and for evaluating minor damage to a vehicle in which structure-borne noise caused by an event, for example, caused by damage and/or a contact is detected and evaluated. Furthermore the invention relates to a sensor arrangement for installation in a vehicle by which means the aforesaid method can be carried out, wherein the sensor arrangement comprises at least one structure-borne noise sensor which can be disposed directly on a vehicle shell of the vehicle and to which at least one evaluation unit is assigned to which the structure-borne noise sensor is connected in a measurement-signal-conducting manner, as well as a vehicle, in particular a motor vehicle having a sensor arrangement for carrying out the method.

2. Brief Discussion of the Related Art

Methods for recording vehicle-relevant data and corresponding sensor arrangements are used, inter alia, in order to detect forces acting on the vehicle shell during driving operation. To this end, the vehicle shell can have a plurality of piezoelectric films configured as structure-borne noise sensors by which means vibrations of the vehicle shell can be recorded. In addition to the forces which occur during normal driving operation, forces acting on the vehicle shell caused by an accident can also be recorded with the structure-borne noise sensors, where data recorded with the structure-borne noise sensors then allow conclusions to be drawn on damage to the respective vehicle and on the origin of the damage, in particular in combination with previously collected vehicle status and/or driving operation data. In addition, in the event of an accident, airbags can be triggered by means of the structure-borne noise sensors in order to protect occupants of a vehicle from injuries.

Whereas accidents can be detected relatively reliably with the known structure-borne noise sensors, lesser damage to the vehicle shell such as scratches or dents, which are subsequently designated as minor damage, also cause measurable structure-borne noise. However at the present time, there is not a method or sensor arrangements in order to be able to detect and evaluation corresponding minor damage, in particular to parked vehicles since the known methods and sensor arrangements do not allow any differentiated evaluation of such damage. Minor damage such as scratches and dents must therefore always be detected and evaluated visually by a person, where a plurality of shortcomings are associated with such a visual inspection. On the one hand, in retrospect it can only be traced back with difficulty how the minor damage has occurred and on the other hand, this can sometimes date back several days so that it is almost impossible to put a time limit on the occurrence of the damage. In addition, the visual investigation by means of a visual inspection of a vehicle is time-consuming so that in some cases, high and frequently recurring costs are incurred, e.g. when handing over or returning a hire car.

BRIEF SUMMARY OF THE INVENTION

It is therefore the object of the invention to provide a method by which means even the slightest minor damage such as scratches or dents can be detected and evaluated precisely in time even when vehicles are parked.

This object is solved by a method, for recording vehicle-relevant data, a sensor arrangement for installation in a vehicle by which means the method is carried out, and a vehicle having the sensor arrangement.

In particular, the present invention provides a method for detecting and for evaluating minor damage to a vehicle in which structure-borne noise caused by an event, for example, caused by damage and/or a contact is detected and evaluated. The structure-borne noise is recorded with its entire frequency spectrum. The frequency spectrum is divided with a filter into a lower frequency range and into an upper frequency range. An event is characterized by at least one amplitude in the upper frequency range, wherein the event having the amplitude in the upper frequency range is included in an envelope curve analysis. The envelope curve analysis for the lower frequency range a lower power density and for the upper frequency range an upper power density is determined. A relative measured value is determined from the ratio of the upper power density to the lower power density. An evaluation of the event is made by means of the relative measured value and that the event is stored.

The sensor arrangement comprises at least one structure-borne noise sensor which can be disposed directly on a vehicle shell of the vehicle and to which at least one evaluation unit is assigned to which the structure-borne noise sensor is connected in a measurement-signal-conducting manner, wherein the evaluation unit comprises at least one frequency converter and at least one spectral analysis device connected after the frequency converter in terms of process technology and an event storage unit is connected to the spectral analysis device.

The vehicle, in particular motor vehicle, has a sensor arrangement for carrying out the method of the present invention.

BRIEF DESCRIPTION OF THE DRAWINGS

The figure is a schematic diagram of the method of the present invention.

DETAILED DESCRIPTION OF THE PREFERRED EMBODIMENTS

The method for recording vehicle-relevant data, in particular for detecting and for evaluating minor damage to a vehicle in which structure-borne noise caused by an event, for example, caused by damage and/or a contact is detected and evaluated, is characterized according to the invention in that the structure-borne noise is recorded with its entire frequency spectrum, the frequency spectrum is divided with a filter into a lower frequency range and into an upper frequency range, an event is characterised by at least one amplitude in the upper frequency range, wherein the event having the amplitude in the upper frequency range is included in an envelope curve analysis, in the envelope curve analysis for the lower frequency range a lower power density and for the upper frequency range an upper power density is determined, a relative measured value is determined from the ratio of the upper power density to the lower power density, an evaluation of the event is made by means of the relative measured value and the event is stored.

By means of the envelope curve analysis of the recorded frequency spectrum it is possible to make a very precise evaluation of individual temporally consecutive amplitudes or frequency spectra which allows a differentiated examination and evaluation of the respective results. The differentiated examination and evaluation of the events can take place automatically directly after or at the same time during the event so that a hitherto necessary visual inspection is omitted and also there is no time mismatch between occurrence and evaluation of an event or damage. The events detected with the method and stored can then be read out simply and further utilised in order, for example, to coordinate witness statements with the origin of an accident, to assess the state of a vehicle to be hired when handing over and/or upon return or to reconstruct minor damage and its occurrence on a parked vehicle. In the case of hire cars, it is thus possible to unambiguously clarify the responsibility for minor damage.

In order to differentiate an event from vibrations of a driving operation or usage as intended, a filter is provided before the actual envelope curve analysis which advantageously lies at a frequency above the vibrations which occur during normal driving operation. Consequently only frequency spectra which have at least an amplitude above the filter are included in the following envelope curve analysis. To this end, the frequency spectra recorded over time are divided into the smallest possible time units, where a normalised amplitude spectrum is created for each frequency spectrum of a time unit, from which frequencies above the filter can be determined as a single amplitude in a simple manner. An event can thus be composed of a plurality of frequency spectra recorded immediately consecutively in time, of two or more time units which are then combined for the envelope curve analysis of the respective event. In particular, the structure-borne noise emanating from nascent minor damage usually extends over a longer period of time and is composed of frequency spectra of a plurality of time units and differs significantly, for example, from the structure-borne noise which is produced during a closing or a slamming of doors of a vehicle and which causes a usually strong, temporally very limited vibration.

If an event is detected, the frequency spectra of this event for the envelope curve analysis are advantageously recorded in an amplitude curve of the upper frequency range and an amplitude curve of the entire frequency spectrum. In this case, only the amplitudes having a frequency above the filter are included in the amplitude curve of the upper frequency range. By integrating the amplitude curves of the upper frequency range and the entire frequency spectrum, their power density is then calculated in a simple manner in each case, which power density corresponds to the respective area below the amplitude curve over time. From the power densities of the upper frequency range and the entire frequency spectrum it is then possible, with overall very few calculation steps, to determine the power density of the lower frequency range by forming the difference value of the power density of the upper frequency range and the power density of the entire frequency range. The ratio of upper power density to lower power density then gives the relative measured value by means of which an automatic evaluation of the event can be made. In a preferred embodiment the relative measured value for minor damage has a value >1 or is at least significantly greater than the value of the other events and therefore can be distinguished significantly from the other events, e.g. door closing or door slamming.

Instead of or in addition to an integration of the amplitude curves, the area below the amplitude curves can be determined by means of ready-made boxes in which a number of different-sized boxes as far as possible filling the entire area below the amplitude curve is determined. The number and the size of the boxes can be compared with box compositions stored for a certain frequency pattern.

The pre-set filter advantageously lies at a frequency of at least 500 Hz. Depending on the type of vehicle and therefore driving-induced basic noise, the filter can also be assigned to other frequencies. The filter is then determined as a function of the respective vehicle and above a driving-induced basic noise of the respective vehicle.

Furthermore, a plurality of measured values can still be detected for an event, where a comprehensive damage picture is created from the measured values. If a plurality of structure-borne noise sensors are disposed on a vehicle, at least a plurality of measured values are available for an event which can then be combined to form a comprehensive damage picture. This damage picture then comprises inter alia information on the position and distribution of minor damage, on the severity of the damage caused and on the time sequence of the formation of the minor damage. In addition, a plurality of measured values for an event can then be combined if these are recorded in a short time sequence and can be linked meaningfully to one another. To this end the sequence of individual events can then be compared with a stored frequency pattern for specific minor damage. In particular, reference is made here to scratches which consist of a plurality of individual scratches and thus are firstly detected as individual events in the evaluation and then combined into a single event and stored. Past events can also be included automatically in the evaluation of future events in order to enable more accurate evaluations of events. Characteristic events not previously considered which however do not constitute minor damage can thus be differentiated from minor damage to be detected.

For a comprehensive damage picture the recorded events can also be stored together with vehicle status data and/or with ambient conditions. Damage which has occurred can then be assessed by an expert more easily and better as a result of comprehensive information without inaccurate witness statements possibly leading to a falsification of the evaluation. Vehicle status data includes, inter alia, engine operating state, speed and/or rpm of the vehicle. Furthermore, the location of the vehicle can be indicated by a link to a GPS signal and the time of the damage by means of a time comparison. Typical ambient conditions relate, for example to external temperature, rain, traffic density, traffic noise etc. According to a further embodiment, the vehicle status data and/or the ambient conditions are additionally included directly in the evaluation of an event so that the occurrence of the damage can be evaluated automatically in real time.

In addition, the invention relates to a sensor arrangement for installation in a vehicle with which the method can be carried out, where the sensor arrangement has at least one structure-borne noise sensor, which can be disposed directly on a vehicle shell of the vehicle and to which at least one evaluation unit is assigned to which the structure-borne noise sensor is connected in a measurement signal conducting manner. The sensor arrangement is characterized according to the invention in that the evaluation unit comprises at least one frequency converter as well as a spectral analysis device connected after the frequency converter in terms of process technology and that an event storage unit is connected to the spectral analysis device. The passive structure-borne noise sensors, which are not visible from outside and which are disposed inside on the vehicle shell, detect the minor damage immediately during its occurrence and independently of the vehicle operating state. In order to record and evaluate the vibrations and therefore the minor damage as accurately as possible, advantageously a plurality of interlinked structure-borne noise sensors are provided distributed spatially on the entire vehicle shell. The events recorded by the individual structure-borne noise sensors can then be compared with one another on the one hand and on the other hand combined into a comprehensive damage picture which is documented. In this case, an evaluation unit can be assigned to each structure-borne noise sensor and the structure-borne noise sensor with the evaluation unit forms a sensor node. The detected events are transmitted by the evaluation unit or units to the event storage unit, for example a retrofitted controller or an on-board vehicle computer and stored. Any damage can then be determined in a simple manner by means of a message, e.g. when starting the vehicle or by reading out using a suitable commercially available reader for the on-board computer and/or the controller.

In addition, the invention relates to a vehicle, in particular a motor vehicle, which is characterized by an aforesaid sensor arrangement for carrying out the aforesaid method. In a preferred embodiment, evaluation unit, event storage unit and controller or on-board computer can be formed as a single spatial unit. According to this, a structure-borne noise complete signal to be evaluated is composed of structure-borne noise of the environment and structure-borne noise of an event, e.g. damage. This structure-borne noise complete signal is converted into a measurement signal by a mechanical/electrical frequency converter, where the measurement signal is composed of frequency spectra. The measurement signal is then evaluated in a next step, where vehicle status data are also included. The evaluation then results in a relative measurement value which is relayed as a message.

The invention claimed is:

1. A method for recording vehicle-relevant data, in particular for detecting and for evaluating damage to a vehicle in which structure-borne noise is detected and evaluated, comprising:
    recording an entire frequency spectrum of the structure-borne noise caused by an event,
    wherein the filter lies at a frequency of at least 500 Hz,
    dividing the frequency spectrum with a filter into a lower frequency range and into an upper frequency range,
    characterizing the event by at least one amplitude in the upper frequency range, wherein the event having an amplitude in the upper frequency range is included in an envelope curve analysis,
    determining a lower power density, and for the upper frequency range, determining an upper power density in the envelope curve analysis for the lower frequency range,
    determining a relative measured value from the ratio of the upper power density to the lower power density, and
    evaluating, by a controller, the event based on the relative measured value and storing the event,
    wherein the event has a plurality of frequency spectra recorded consecutively in time which are combined for the envelope curve analysis of the event and the plurality of frequency spectra is represented in an amplitude curve of the upper frequency range and an amplitude curve of the entire frequency spectrum, and wherein by integrating the amplitude curve of the upper frequency range and the entire frequency spectrum calculates their respective power densities,
    the event is stored together with vehicle status data and ambient conditions,
    at least one of the vehicle status data and the ambient conditions are included in the evaluation of the event,
    a plurality of measured values are detected and combined for the event and a comprehensive damage pattern is prepared from the plurality measured values, and
    the plurality of measured values for the event is compared with a stored frequency pattern for a specific damage.

2. The method according to claim 1, wherein the power density of the lower frequency range is determined by determining the difference value of the power densities of the upper frequency range and the entire frequency spectrum.

3. The method according to claim 1, wherein the ratio of the upper power density to the lower power density is greater than 1.

4. The method according to claim 1, wherein past events are included in evaluation of future events.

5. A sensor arrangement for installation in a vehicle that is configured to perform the method according to claim 1, wherein the sensor arrangement comprises at least one structure-borne noise sensor which is disposed directly on a vehicle shell of the vehicle and to which at least one evaluation unit is assigned to which the structure-borne noise sensor is connected for signal measuring, wherein
    the evaluation unit comprises at least one frequency converter and at least one spectral analysis device connected after the frequency converter in terms of process technology; and
    an event storage unit is connected to the spectral analysis device.

6. A vehicle, in particular motor vehicle, having the sensor arrangement according to claim 5.

* * * * *